United States Patent
Engström et al.

(10) Patent No.: US 8,715,126 B2
(45) Date of Patent: May 6, 2014

(54) POWERTRAIN FOR A VEHICLE

(75) Inventors: Jörgen Engström, Grödinge (SE);
Mikael Bergquist, Hägersten (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/997,355

(22) PCT Filed: Dec. 16, 2011

(86) PCT No.: PCT/SE2011/051529
§ 371 (c)(1),
(2), (4) Date: Jun. 24, 2013

(87) PCT Pub. No.: WO2012/091659
PCT Pub. Date: Jul. 5, 2012

(65) Prior Publication Data
US 2013/0316865 A1    Nov. 28, 2013

(30) Foreign Application Priority Data
Dec. 29, 2010 (SE) ...................................... 1051384

(51) Int. Cl.
F16H 48/06    (2006.01)
(52) U.S. Cl.
USPC ........................................................ 475/149
(58) Field of Classification Search
USPC .............. 477/3, 5, 174, 181; 475/5, 149, 150, 475/223
See application file for complete search history.

(56) References Cited

U.S. PATENT DOCUMENTS

| | | | | |
|---|---|---|---|---|
| 4,010,653 A | * | 3/1977 | Mekjian | 475/311 |
| 5,326,334 A | * | 7/1994 | Ra et al. | 475/330 |
| 5,330,395 A | * | 7/1994 | Ra et al. | 475/330 |
| 5,466,196 A | * | 11/1995 | Ra et al. | 475/59 |

(Continued)

FOREIGN PATENT DOCUMENTS

| | | |
|---|---|---|
| DE | 102 25 249 A1 | 12/2003 |
| DE | 10 2006 003 715 A1 | 8/2007 |

(Continued)

OTHER PUBLICATIONS

International Search Report dated Apr. 10, 2012 issued in corresponding international patent application No. PCT/SE2011/051529.

(Continued)

*Primary Examiner* — David D Le
*Assistant Examiner* — David J Hlavka
(74) *Attorney, Agent, or Firm* — Ostrolenk Faber LLP

(57) ABSTRACT

A propulsion system for a vehicle has output shaft (2) of a combustion engine (1), which is connected to a first component (9) of a planetary gear so that they rotate at a first speed ($n_1$). An input shaft (3) of a gearbox (4) is connected to a second component (11) of the planetary gear so that they rotate at a second speed ($n_2$). An electrical machine is connected to a third component (10) of the planetary gear so that the third component (10) rotates at a third speed ($n_3$). A control unit (17) estimates in appropriate operating situations a desired speed ($n_2$) for the gearbox input shaft (3). The unit receives information about the speed ($n_1$) of the engine output shaft (2). It causes the electrical machine to give the third component (10) of the planetary gear a speed ($n_3$) which in conjunction with the speed ($n_1$) of the engine output shaft (2) results in the gearbox input shaft (3) assuming the desired speed ($n_2$).

9 Claims, 2 Drawing Sheets

(56) References Cited

U.S. PATENT DOCUMENTS

| | | | |
|---|---|---|---|
| 6,354,974 B1 | 3/2002 | Kozarekar | |
| 8,622,864 B2* | 1/2014 | Fauteux et al. | 475/91 |
| 2008/0318720 A1* | 12/2008 | Fukuda et al. | 475/5 |
| 2010/0029428 A1* | 2/2010 | Abe et al. | 475/5 |
| 2010/0173746 A1 | 7/2010 | Ideshio et al. | |

FOREIGN PATENT DOCUMENTS

| | | |
|---|---|---|
| DE | 10 2006 003 724 A1 | 8/2007 |
| DE | 10 2006 003 725 A1 | 8/2007 |
| DE | 10 2006 010 223 A1 | 9/2007 |
| EP | 1 319 546 A1 | 6/2003 |
| GB | 2 390 871 | 1/2004 |
| WO | WO 2009/147501 A2 | 12/2009 |

OTHER PUBLICATIONS

International Preliminary Report on Patentability issued in corresponding international patent application No. PCT/SE2011/051529.

* cited by examiner

POWERTRAIN FOR A VEHICLE

CROSS-REFERENCE TO RELATED APPLICATIONS

The present application is a 35 U.S.C. §§371 national phase conversion of PCT/SE2011/051529, filed Dec. 16, 2011, which claims priority of Swedish Application No. 1051384-4, filed Dec. 29, 2010, the contents of which are incorporated by reference herein. The PCT International Application was published in the English language.

BACKGROUND TO THE INVENTION AND PRIOR ART

The present invention relates to a propulsion system for a vehicle.

Hybrid vehicles may be powered by a primary prime mover which may be a combustion engine, and by a secondary prime mover which may be an electrical machine. The electrical machine will be equipped with at least one battery to store electrical energy and with regulating equipment to regulate the flow of electrical energy between the battery and the electrical machine. The electrical machine may thus serve alternately as motor and generator, depending on the vehicle's operating state. When the vehicle is braked, the electrical machine generates electrical energy which is stored in the battery. The stored electrical energy is subsequently used to operate the vehicle. The electrical machine may be situated at a location between a clutch mechanism and the gearbox of the vehicle. For the sake of space, it is advantageous to connect the electrical machine directly to the input shaft of the gearbox.

There are disadvantages in using a conventional clutch mechanism which disconnects the gearbox input shaft from the engine during gearchange processes in the gearbox. When a vehicle moves off from stationary, the discs of the clutch mechanism slide against one another, thereby warming them. This warming results in greater fuel consumption and in clutch disc wear. A conventional clutch mechanism is also relatively heavy and expensive. It also occupies a relatively large amount of space in the vehicle.

U.S. Pat. No. 6,354,974 refers to a propulsion system for a hybrid vehicle provided with a combustion engine and an electrical machine which is situated on the output shaft of the engine. The object is to create a compact propulsion unit which need not use a conventional clutch mechanism. The conventional clutch mechanism is replaced by a planetary gear and three friction clutches. The friction clutches make it possible to create various operating states of the vehicle. Using friction clutches results in energy losses.

SUMMARY OF THE INVENTION

The object of the present invention is to propose a propulsion system for a vehicle which makes it possible to vary in a desired way the speed of an input shaft to a gearbox.

This object is achieved with the propulsion system of the invention. A planetary gear usually comprises three components arranged for rotation relative to one another, viz. a sun wheel, a planet wheel carrier and a ring gear. On the basis of knowing the number of teeth of the sun wheel and the ring gear it is possible to determine during operation the mutual speeds of the three components. According to the present invention, one of the planetary gear's components is connected to an output shaft of the combustion engine. This component of the planetary gear thus rotates at the same speed as the engine. Another component of the planetary gear is connected to an input shaft of the gearbox. This component of the planetary gear therefore rotates at the same speed as the gearbox input shaft. A third component of the planetary gear is connected to a rotor of an electrical machine. This component of the planetary gear thus rotates at the same speed as the electrical machine when they are directly connected to one another. Alternatively, the electrical machine may be connected to the third component of the planetary gear via a transmission which has a gear ratio. In this case the electrical machine and the third component of the planetary gear may rotate at different speeds. The speed of electrical machines can be regulated steplessly. In operating situations where the gearbox input shaft is to turn at a desired speed, the control unit uses knowledge of the combustion engine's speed to calculate the speed at which the third component has to be run to achieve the desired speed of the gearbox input shaft. The control unit then activates the electrical machine to impart the calculated speed to the third component and consequently the desired speed to the gearbox input shaft.

According to an embodiment of the present invention, the control unit is adapted to estimating a desired speed of the gearbox input shaft at which it is possible to disengage and/or engage a gear in an optimum way during a gearchange process in the gearbox, and to controlling the electrical machine so that it imparts to the third component of the planetary gear a speed which in conjunction with that of the engine output shaft results in the gearbox input shaft assuming the desired speed.

At times when a current gear is to be disengaged in the gearbox, a torque-free state has to be created in the gearbox. On the basis of information about the vehicle's speed and the current gear engaged in the gearbox, the control unit can calculate the speed at which the gearbox input shaft has to rotate in order to create in the gearbox a torque-free state. The control unit then controls the electrical machine so that in conjunction with the engine it imparts to the gearbox input shaft the calculated speed. Once a torque-free state has been created in the gearbox, the current gear is disengaged. When another gear is to be engaged in the gearbox, the control unit uses knowledge of the vehicle's speed and the other gear to calculate the input shaft speed at which it can be engaged. The control unit then controls the electrical machine so that in conjunction with the engine it imparts to the gearbox input shaft the calculated speed, after which the other gear is engaged.

When the electrical machine has this function, no conventional clutch mechanism need be used to disconnect the engine output shaft from the gearbox input shaft during a gearchange process. The cost of the clutch mechanism and components for operating it can therefore be saved. The energy loss arising from the clutch discs sliding against one another in a conventional clutch mechanism does not occur with the present arrangement. The arrangement according to the present invention thus results in a more energy-economising gearchange process.

According to a preferred embodiment of the present invention, the control unit is adapted to controlling the electrical machine so that it imparts to the third component of the planetary gear a speed which in conjunction with the speed of the engine output shaft results in the gearbox input shaft assuming a predetermined ratio relative to the speed of the engine output shaft during a process of setting the vehicle in motion from stationary. The gear ratio of the gearbox input shaft is varied appropriately during this process so that the vehicle moves off smoothly at a controlled torque.

According to a preferred embodiment of the invention, the propulsion system comprises a clutch device which makes it possible for the engine output shaft and the gearbox input shaft to be releasably connected together during operation of the vehicle. When a gear has been engaged in the gearbox, the control unit controls the electrical machine with the object of imparting to the gearbox input shaft the same speed as the combustion engine. When this has been achieved, the control unit activates the clutch device which connects together the engine output shaft and the gearbox input shaft. In this connected state, the gear ratio between the engine and the gearbox input shaft is 1:1. The engine output shaft and the gearbox input shaft therefore rotate as a unit.

Before the current gear is disengaged during a subsequent gearchange process, however, the clutch device has to be released so that the engine output shaft and the gearbox input shaft are allowed to rotate at different speeds. Said clutch device may have a shift means which is arranged for movement in an axial direction on the engine output shaft and which comprises a first connecting portion adapted to coming into contact with a second connecting portion of the planet wheel carrier in a mutually connected state in which the engine output shaft and the gearbox input shaft rotate at the same speed. The engine output shaft can thus be connected to the gearbox input shaft in a relatively simple and functional way.

According to another preferred embodiment of the invention, the engine output shaft is connected to the sun wheel of the planetary gear, the gearbox input shaft is connected to the planet wheel carrier of the planetary gear, and the rotor of the electrical machine is connected to the ring gear of the planetary gear. This means that the components concerned may form a compact configuration.

It is possible, however, to connect the engine output shaft, the gearbox input shaft and the electrical machine's rotor to any of the other components of the planetary gear. With advantage, the sun wheel is connected to a peripheral surface of the engine output shaft, the planet wheel carrier is connected to a peripheral surface of the gearbox input shaft, and the electrical machine's rotor is connected to the engine output shaft and the gearbox input shaft. The sun wheel and the planet wheel carrier may respectively be connected to the engine output shaft and the gearbox input shaft by splined or similar connections. Assurance is thus afforded that the sun wheel will rotate at the same speed as the engine output shaft and that the planet wheel carrier will rotate at the same speed as the gearbox input shaft. The electrical machine's rotor may be firmly attached to an external peripheral surface of the ring gear. The ring gear's internal peripheral surface is usually provided with teeth. The ring gear's external peripheral surface is usually smooth and very well suited to supporting the electrical machine's rotor. The ring gear and the electrical machine's rotor thus form a rotatable unit. Alternatively, the electrical machine's rotor may be connected to the ring gear via a transmission.

According to an alternative embodiment of the present invention, the engine output shaft, the electrical machine's rotor and the gearbox input shaft are arranged for rotation about a common axis of rotation. The engine output shaft and the gearbox input shaft are in this case arranged coaxially. The electrical machine is with advantage situated close to two neighbouring end portions of said shafts. At least one of the planetary gear's components is situated in a radial space between the electrical machine's stator and said common axis of rotation. There is usually an existing radial space between the electrical machine's stator and the axis of rotation. The whole planetary gear is preferably situated in this space. The electrical machine and the planetary gear will thus substantially not occupy more space than the electrical machine alone. Such an arrangement makes a very compact configuration possible.

According to an alternative embodiment of the present invention, the control unit is adapted to controlling the electrical machine so that in certain appropriate operating situations it uses stored electrical energy to impart propulsive force to the gearbox input shaft, and in other operating situations it uses the kinetic energy of the gearbox input shaft to recover and store electrical energy. In this case the vehicle is a hybrid vehicle powered by a primary prime mover in the form of a combustion engine and by a secondary prime mover in the form of said electrical machine. The electrical machine is equipped with at least one battery to store electrical energy and with regulating equipment to regulate the flow of electrical energy between the battery and the electrical machine. The electrical machine thus not only has the function of making it possible to control the speed of the gearbox input shaft but also the ability to operate alternately as motor and generator, depending on the vehicle's operating state.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
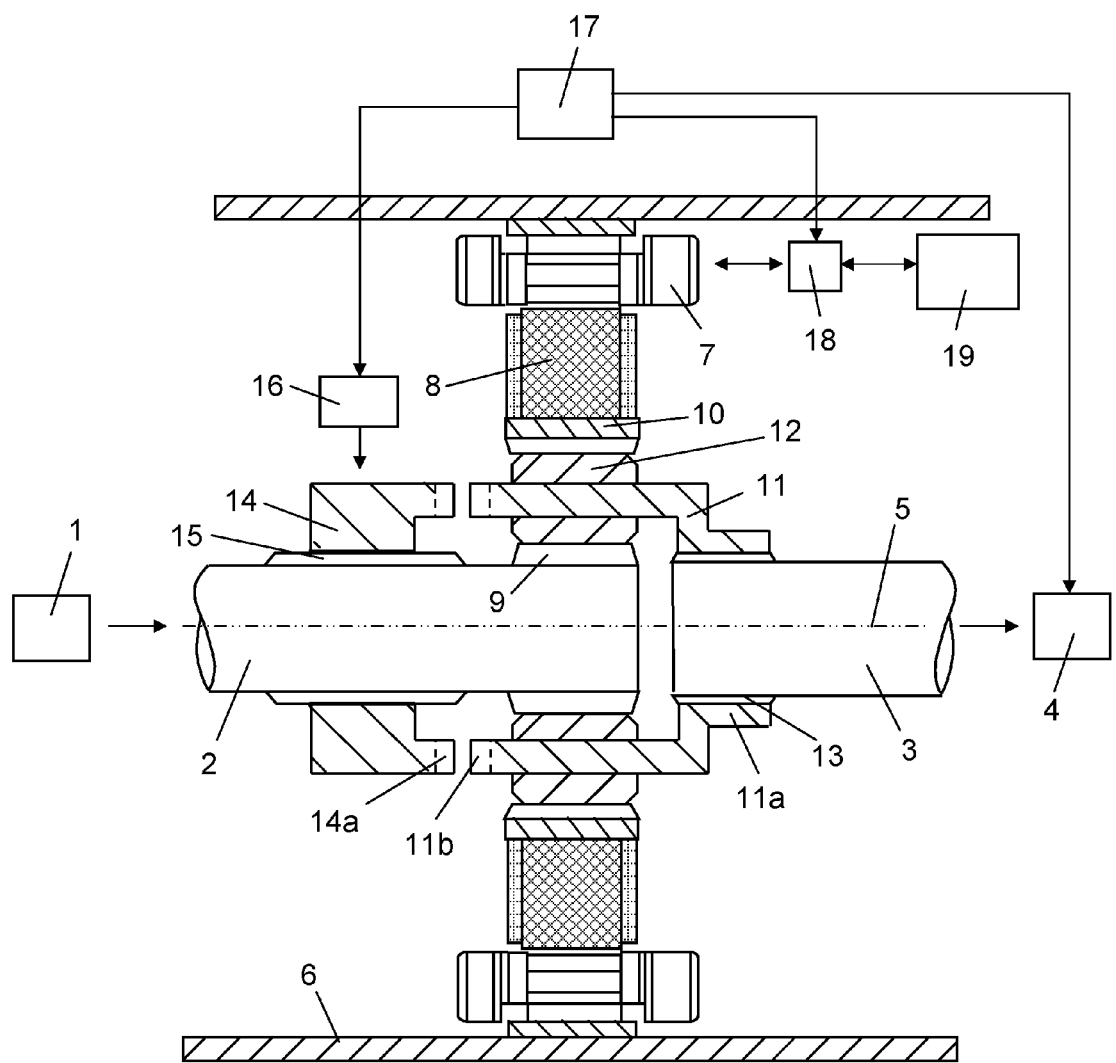
FIG. 1 depicts a propulsion system for operating a vehicle according to the present invention and FIG. 2 shows how the speed of the various components of the propulsion system may vary during operation of the propulsion system in FIG. 1.

FIG. 1 depicts a propulsion system for operating a vehicle. The vehicle is in this case a hybrid vehicle powered primarily by a combustion engine 1 which may be a diesel engine 1. The engine 1 is provided with an output shaft 2. The engine output shaft 2 is arranged coaxially relative to an input shaft 3 to a gearbox 4. The engine output shaft 2 and the gearbox input shaft 3 are arranged for rotation about a common axis of rotation 5. The hybrid vehicle has a housing 6 which encloses an electrical machine and a planetary gear in a region which contains one end of the engine output shaft 2 and one end of the gearbox input shaft 3. The electrical machine comprises in a conventional way a stator 7 and a rotor 8. The stator 7 has a stator core fastened appropriately to the inside of the housing 6. The stator core comprises the stator's windings. The electrical machine is adapted in certain operating situations to using stored electrical energy to impart propulsive force to the gearbox input shaft 3, and in other operating situations to using the kinetic energy of the gearbox input shaft 3 to recover and store electric energy.

The planetary gear is situated substantially radially internally to the electrical machine's stator 7 and rotor 8. The planetary gear comprises in a conventional way a sun wheel 9, a ring gear 10 and a planet wheel carrier 11. The planet wheel carrier 11 supports a number of gearwheels 12 arranged for rotation in a radial space between the teeth of the sun wheel and of the ring gear 10. The sun wheel 9 is fastened to a peripheral surface of the engine output shaft 2. The sun wheel 9 and the engine output shaft 2 rotate as a unit at a first speed $n_1$. The planet wheel carrier 11 has a fastening portion 11a fastened to a peripheral surface of the gearbox input shaft 3 by a splined connection 13. This connection makes it possible for the planet wheel carrier 11 and the gearbox input shaft 3 to rotate as a unit at a second speed $n_2$. The ring gear 10 has an external peripheral surface on which the rotor 8 is firmly mounted. The rotor 8 and the ring gear 10 constitute a rotatable unit which rotates at a third speed $n_3$.

The engine output shaft 2 is provided with a movable connecting means 14. The connecting means is fastened to the engine output shaft 2 by a splined connection 15. The connecting means is in this case situated on, for joint rotation with, the engine output shaft 2 and is movable in an axial direction on the engine output shaft 2. The connecting means has a connecting portion 14a connectable to a connecting portion 11b of the planet wheel carrier 11. A schematically depicted shift means 16 is adapted to moving the connecting means between a first position in which the connecting portions 14a, 11b are not in mutual engagement and a second position in which they are in mutual engagement. When the connecting portions 14b, are in mutual engagement, the engine output shaft 2 and the gearbox input shaft 3 will rotate at the same speed.

An electrical control unit 17 is adapted to controlling the shift means 16. The control unit 17 is also adapted to deciding when the electrical machine is to serve as a motor and when as a generator. To decide this, the control unit 17 may receive current information from suitable operating parameters. The control unit 17 may be a computer with suitable software for this purpose. The control unit 17 also controls schematically depicted regulating equipment 18 which regulates the flow of electrical energy between a battery 19 and the electrical machine's stator 7. At times when the electrical machine serves as a motor, stored electrical energy is supplied from the battery 19 to the stator 7. At times when the electrical machine serves as a generator, electrical energy is supplied from the stator 7 to the battery 19. Where the space between the engine 1 and the gearbox 4 in a vehicle is limited, the electrical machine and the planetary gear need to constitute a compact unit. The planetary gear's components 9-11 are in that case arranged substantially radially internally to the electrical machine's stator 7. The electrical machine's rotor 8, the planetary gear's ring gear 10, the engine output shaft 2 and the gearbox input shaft 3 are here arranged for rotation about a common axis of rotation 5. In such a version, the electrical machine and the planetary gear constitute a very compact unit.

Figure 2:
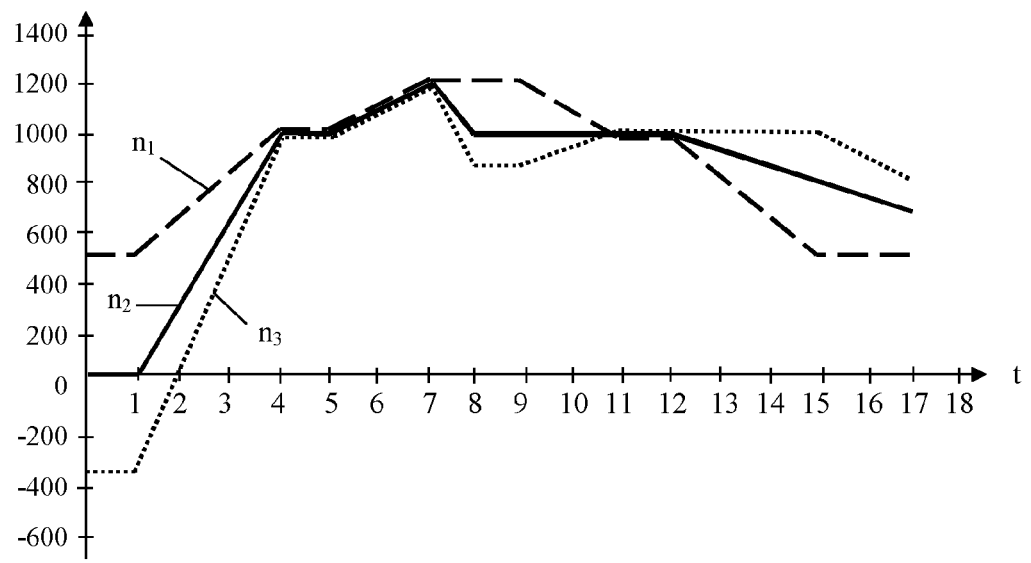
Figure 3:
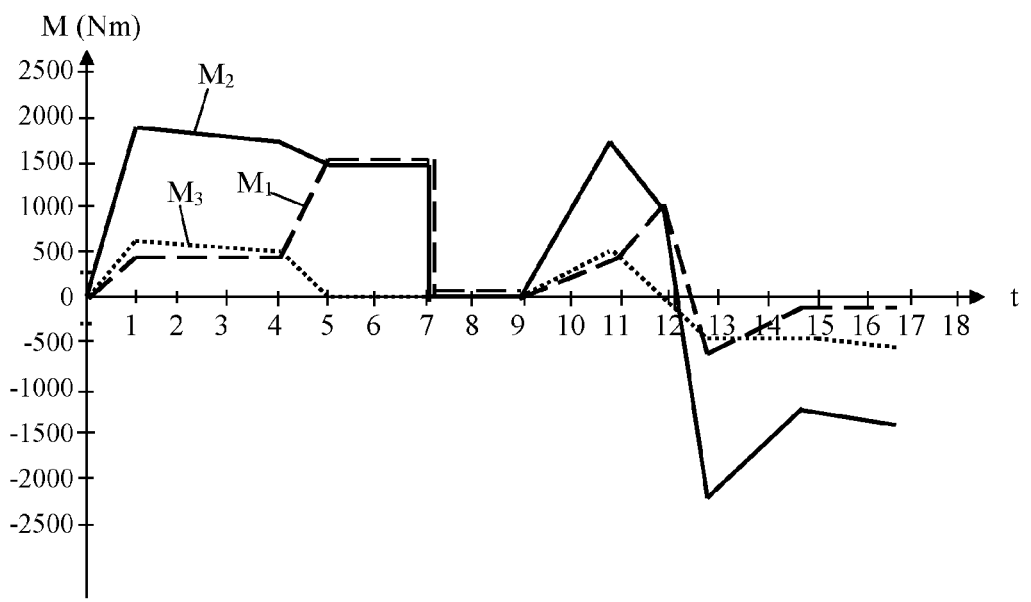
FIG. 3 shows how the torque of the components in FIG. 2 may vary during operation.

FIGS. 2 and 3 illustrate an example of how the speed n and the torque M may vary against time t for the engine output shaft 2, the electrical machine's rotor 8 and the gearbox input shaft 3 in different operating situations of the vehicle. The speed $n_1$ and torque $M_1$ of the engine output shaft 2 are represented by broken lines, the speed $n_2$ and torque $M_2$ of the gearbox input shaft 3 by continuous lines and the speed $n_3$ and torque $M_3$ of the electrical machine by dotted lines. The relationship between the number of teeth $z_1$ of the sun wheel 9 and the number of teeth $z_2$ of the ring gear 10 is in this example $z_1/z_2=0.7$.

The combustion engine 1 starts up during the period t=0-1. It idles initially at 500 rpm. Thus no gear is engaged in the gearbox and the vehicle is stationary. To make it possible to engage a first gear in the gearbox 4, its input shaft 3 has also to be stationary. The speed $n_2$ of the gearbox input shaft 3 has thus to be 0 rpm for it to be possible to engage the first gear. The control unit 17 therefore uses knowledge of the gear ratio in the planetary gear as a basis for calculating the speed $n_3$ at which the electrical machine needs to drive the ring gear 10 for the speed $n_2$ of the gearbox input shaft 3 to become 0. The electrical machine has here to rotate the ring gear 10 in an opposite direction relative to the engine output shaft 2 at a speed $n_3$ which with the aforesaid gearwheel ratio becomes $-0.7 \times 500$ rpm$=-350$ rpm. The control unit 17 here controls the electrical machine and the ring gear 10 so that they assume a speed $n_3$ of $-350$ rpm. During the period t=0-1, a torque-free state therefore prevails in the gearbox 4. The engine output shaft 2, the electrical machine and the gearbox input shaft 3 assume respective torques $M_1$, $M_2$ and $M_3$ which increase in a substantially linear way during this period.

At t=1 a first gear is engaged in the gearbox 4. During the period t=1-4, the vehicle is accelerated by the combustion engine and the electrical machine. The control unit 17 calculates here how the electrical machine's speed $n_3$ has to vary for it to be able to help the engine to accelerate the vehicle in a desired way. The engine speed $n_1$ increases here in a substantially linear way from 500 rpm to 1000 rpm. The control unit 17 also increases the electrical machine's speed $n_3$ in a substantially linear way from 350 rpm to 1000 rpm, i.e. to the same speed as the engine. The engine's torque $M_1$ and the electrical machine's torque $M_3$ are substantially equal during this period. The engine speed $n_1$ is converted here by the planetary gear to a speed $n_2$ of the gearbox input shaft 3 with a variable gear ratio which results in the vehicle moving off smoothly at a controlled torque $M_2$.

At t=4, the gearbox input shaft 3 will have reached the same speed $n_2$ as the engine output shaft's speed $n_1$. The control unit 17 activates here the shift means 16 to move the connecting means 14 to a connecting position in which the connecting portions 14a, 11b enter into mutual engagement. During the period t=4-7, the combustion engine caters for substantially the whole operation of the gearbox input shaft 3 and hence of the vehicle. The electrical machine's torque $M_3$ drops here to 0, but the electrical machine rotates at the same speed $n_3$ as the engine output shaft 2 and the gearbox input shaft 3. During the period t=5-7, the vehicle's speed increases, resulting in a corresponding increase in the speeds $n_1$, $n_2$, $n_3$ of said components.

At t=7, a higher gear needs to be engaged in the gearbox 4. The control unit 17 activates the shift means 16 to move the coupling means 14 to a disconnected position. The connection between the engine output shaft 2 and the gearbox input shaft 3 ceases. The control unit 17 calculates here the speed $n_2$ at which the gearbox input shaft 3 needs to be run to achieve the torque-free state in the gearbox 4 by means of the vehicle's speed and the currently engaged gear in the gearbox 4. The control unit 17 then calculates the speed $n_3$ at which the electrical machine needs to be run for the gearbox input shaft 3 to assume the calculated speed $n_2$ at the engine's prevailing speed $n_1$. The control unit 17 activates the electrical machine with the calculated speed $n_3$ so that a torque-free state is created in the gearbox, whereupon the gear is disengaged. All of the torques $M_1$, $M_2$ and $M_3$ are here 0.

When the current gear has been disengaged, another gear is to be engaged. The control unit 17 calculates here a desired speed $n_2$ at which the gearbox input shaft 3 needs to be run to create a torque-free state in the gearbox 4 when the other gear is engaged. The control unit 17 then calculates the speed $n_3$ at which the electrical machine needs to be run for the gearbox input shaft 3 to assume the calculated speed $n_2$ at the engine's prevailing speed $n_1$. The control unit 17 activates the electrical machine with a calculated speed $n_3$, whereupon the other gear is engaged. This takes place at t=9. During the period t=9-11, the vehicle is powered by the combustion engine and the electrical machine with substantially equal respective torques $M_1$ and $M_3$. The control unit 17 controls the electrical machine's speed $n_3$ with the object of maintaining a speed $n_2$=1000 rpm of the gearbox input shaft 3 while at the same time the engine speed $n_1$ drops from 1200 rpm to 1000 rpm.

At t=11, the engine will have assumed the same speed $n_1$ as the speed $n_2$ of the gearbox input shaft 3. The control unit 17 activates the shift means 16 to move the connecting means 14 to the connecting position. During the period t=11-12, the engine progressively takes over the propulsion of the vehicle. At t=12, the driver releases the accelerator pedal. The gearbox input shaft 3 then drives the electrical machine while at the same time the engine brakes. The electrical machine generates here electrical energy which is stored in the battery 19. At t=15, the engine speed $n_1$ will have dropped to idling at 500 rpm. The electrical machine's speed $n_3$ and the gearbox input shaft's speed $n_2$ continue to drop until the curves cease at t=17.

At times when a current gear is to be disengaged in the gearbox or another gear is to be engaged, the present arrangement creates a torque-free state in the gearbox 4 by means of the electrical machine. This means that no clutch mechanism need be used to disconnect the engine from the gearbox 4 during a gearchange process. A conventional clutch mechanism with associated control equipment may therefore be dispensed with. During a moving-off process of the vehicle and when another gear is being engaged, no sliding clutch discs need be used to give the engine and the gearbox input shaft 3 the same speed. The result is a significantly more energy-economising gearchange process and move-off process than when using a conventional clutch mechanism. The control unit 17 in this case varies the gear ratio between the engine and the gearbox input shaft 3 by means of the electrical machine until the engine and the gearbox input shaft assume the same speed. It is thus possible to achieve a smooth move-off at a controlled torque.

The invention is in no way restricted to the embodiment to which the drawings refer but may be varied freely within the scopes of the claims. For example, a transmission with a gear ratio may be situated between the rotor 8 and the ring gear 10, which therefore need not rotate at the same speed.

The invention claimed is:

1. A propulsion arrangement for a vehicle, wherein
the vehicle comprises:
a combustion engine comprising an output shaft, a gearbox having an input shaft, an electrical machine comprising a stator and a rotor, and a planetary gear including components comprising a sun wheel, a ring gear and a planet wheel carrier;
the propulsion arrangement comprising:
the engine output shaft being connected to the sun wheel of the planetary gear so that they rotate as a unit at a first speed, the gearbox input shaft being connected to the planet wheel carrier of the planetary gear so that they rotate as a unit at a second speed, and the electrical machine rotor being connected to the ring gear of the planetary gear so that the ring gear of the planetary gear rotates at a third speed; and
the propulsion system comprises a control unit configured and operable for estimating, in operating situations, a desired speed of the gearbox input shaft for receiving information about the speed of the engine output shaft and for controlling the electrical machine to operate the ring gear of the planetary gear at a speed such that in conjunction with the speed of the engine output shaft, the gearbox input shaft assumes the desired speed.

2. An arrangement according to claim 1, wherein the control unit is configured and operable for estimating a desired speed of the gearbox input shaft at which a gear of the vehicle may be disengaged and/or engaged in an optimum way during a gearchange process in the gearbox, and for controlling the electrical machine so that it gives the ring gear of the planetary gear a speed which in conjunction with the speed of the engine output shaft results in the gearbox input shaft assuming the desired speed.

3. An arrangement according to claim 2, wherein the control unit is configured and operable for causing the electrical machine to give the ring gear of the planetary gear a speed which in conjunction with the speed of the engine output shaft causes the gearbox input shaft to assume the desired speed relative to the speed of the engine output shaft at a predetermined gear ratio of the vehicle during a move-off process of the vehicle.

4. An arrangement according to claim 1, further comprising a coupling device configured and operable for releasably connecting together the engine output shaft and the gearbox input shaft during operation of the vehicle.

5. An arrangement according to claim 4, wherein the coupling device includes a shift device configured and arranged for movement in an axial direction on the engine output shaft, the shift device has a first connecting portion located, configured and operable for coming into contact with a second connecting portion of the planet wheel carrier in a mutually connected state in which the engine output shaft and the gearbox input shaft rotate at the same speed.

6. An arrangement according to claim 1, wherein the sun wheel of the planetary gear is connected to a peripheral surface of the engine output shaft, the planet wheel carrier has a fastening portion connected to a peripheral surface of the gearbox input shaft and the electrical machine rotor is connected to a peripheral surface of the ring gear.

7. An arrangement according to claim 1, wherein the engine output shaft, the electrical machine rotor and the gearbox input shaft are arranged for rotation about a common axis of rotation.

8. An arrangement according to claim 7, wherein at least one of the planetary gear components is situated in a radial space between the electrical machine stator and the common axis of rotation.

9. An arrangement according to claim 1, wherein the control unit is configured for controlling the electrical machine so that in some operating situations, the electrical machine uses stored electrical energy to impart propulsive force to the gearbox input shaft and in other operating situations, the electrical machine uses kinetic energy of the gearbox input shaft to recover and store electrical energy.

* * * * *